United States Patent
Bae et al.

(10) Patent No.: US 12,457,046 B2
(45) Date of Patent: Oct. 28, 2025

(54) DEVICES INCLUDED IN A WIRELESS NEURAL INTERFACE SYSTEM

(71) Applicant: Gbrain, Inc., Incheon (KR)

(72) Inventors: Joon Sung Bae, Chuncheon-si (KR); Young Cheol Chae, Seoul (KR); Byeong Seol Kim, Wonju-si (KR); Chang Uk Lee, Seoul (KR)

(73) Assignee: GBRAIN, INC., Incheon (KR)

( * ) Notice: Subject to any disclaimer, the term of this patent is extended or adjusted under 35 U.S.C. 154(b) by 435 days.

(21) Appl. No.: 17/986,988

(22) Filed: Nov. 15, 2022

(65) Prior Publication Data

US 2023/0308191 A1    Sep. 28, 2023

(30) Foreign Application Priority Data

Feb. 25, 2022  (KR) .................. 10-2022-0024951

(51) Int. Cl.
*A61N 1/00*    (2006.01)
*A61B 5/00*    (2006.01)
(Continued)

(52) U.S. Cl.
CPC ............ *H04B 13/005* (2013.01); *H02J 50/10* (2016.02); *H03M 7/6011* (2013.01)

(58) Field of Classification Search
None
See application file for complete search history.

(56) References Cited

U.S. PATENT DOCUMENTS 7,209,788 B2 * 4/2007 Nicolelis .............. G06F 3/016
                                              600/545
7,382,850 B2 * 6/2008 Zierhofer ........... A61N 1/37252
                                              375/242

(Continued)

FOREIGN PATENT DOCUMENTS

JP      2013500522 A    1/2013
JP      2014513562 A    6/2014

(Continued)

OTHER PUBLICATIONS

Caterina Carboni, et al., "A sigma-delta architecture for recording of peripheral neural signals in prosthetic applications.", IEEE, (2012), vol. 978, pp. 448-453.

(Continued)

*Primary Examiner* — Tuan A Tran
(74) *Attorney, Agent, or Firm* — CANTOR COLBURN LLP (57) ABSTRACT

Devices included in a wireless neural interface system are disclosed. According to an embodiment, an internal device of a wireless neural interface system that performs communication through a human body channel may include: bio-electrodes including a first electrode, a second electrode, a third electrode, and a fourth electrode that are attached inside a human body; an oversampling converter configured to detect a biosignal on the basis of the first electrode and the second electrode, and output an oversampling signal by oversampling the biosignal; a wireless signal transmitter configured to encode the oversampling signal on the basis of a human body channel characteristic, and transmit the encoded oversampling signal to an external device, which is connected with the internal device through the human channel, through the third electrode; and a wireless power receiver configured to supply power to the oversampling (Continued)

converter and the wireless signal transmitter in response to a power signal received from the external device through the fourth electrode.

12 Claims, 7 Drawing Sheets

(51) Int. Cl.
*A61N 1/36* (2006.01)
*A61N 1/372* (2006.01)
*A61N 1/378* (2006.01)
*H02J 50/10* (2016.01)
*H03M 7/30* (2006.01)
*H04B 5/00* (2024.01)
*H04B 13/00* (2006.01)

(56) References Cited

U.S. PATENT DOCUMENTS

| | | | |
|---|---|---|---|
| 8,332,024 B2* | 12/2012 | Rapoport | A61B 5/0031 |
| | | | 330/261 |
| 9,326,720 B2* | 5/2016 | McLaughlin | A61B 5/4094 |
| 9,326,726 B2* | 5/2016 | Lanning | A61B 5/0006 |
| 9,522,270 B2* | 12/2016 | Perryman | A61N 1/36125 |
| 9,814,885 B2* | 11/2017 | Molnar | A61N 1/36185 |
| 9,872,089 B2* | 1/2018 | Ha | H04B 5/79 |
| 10,027,362 B2* | 7/2018 | Liu | A61B 5/369 |
| 10,493,279 B2* | 12/2019 | Perryman | H02J 50/23 |
| 11,278,226 B2* | 3/2022 | Heydari | G06F 3/01 |
| 11,813,453 B2* | 11/2023 | Greenberg | A61N 1/3758 |
| 11,980,427 B2* | 5/2024 | Bergman | G06N 20/10 |
| 12,144,997 B2* | 11/2024 | Sen | A61N 1/3787 |
| 2015/0084799 A1* | 3/2015 | Zare-Hoseini | H03M 1/12 |
| | | | 341/155 |
| 2016/0323000 A1* | 11/2016 | Liu | H04W 4/80 |
| 2017/0031441 A1 | 2/2017 | Muller et al. | |

FOREIGN PATENT DOCUMENTS

| | | |
|---|---|---|
| KR | 1020120056832 | 6/2012 |
| WO | 2012103519 A2 | 8/2012 |
| WO | 2020227433 A1 | 11/2020 |

OTHER PUBLICATIONS

Changuk Lee, "A Miniaturized Wireless Neural Implant With Body-Coupled Data Transmission and Power Delivery for Freely Behaving Animals", ISSCC, (2022), pp. 1-4.
European Search Report—Rule 69—European Application No. 22203405.0-1113 dated Sep. 4, 2023.
Extended European Search Report—European Application No. 22203405.0-1113 dated May 12, 2023, citing references listed within.
Japanese Office Action—Japanese Application No. 2022-209223 dated Jan. 9, 2024, citing references listed within.
Lee, Changuk, et al., "A Miniaturized Wireless Neural Implant with Body-Coupled Power Delivery and Data Transmission", IEEE Journal of Solid-State Circuits, (Nov. 2022), vol. 57, IssueL 11, pp. 1-19.

* cited by examiner

DEVICES INCLUDED IN A WIRELESS NEURAL INTERFACE SYSTEM

BACKGROUND OF THE INVENTION

Field of the Invention

The following disclosure relates to devices included in a wireless neural interface system.

The present disclosure is a research result supported with Brain to X development subject of a fully implantable closed circuit for voice communication of industrial technology alchemist project financially supported by Ministry of Trade, Industry and Energy of Korea in 2020 (subject No. 20012355). The detailed information of the national subject acknowledgment of the present disclosure is as follows. Subject No: 20012355, Department name: Ministry of Trade, Industry and Energy, Research project name: industrial technology alchemist project, Research subject name: development of Brain to X of a fully implantable closed circuit for voice communication, Research and management institution: Korea Evaluation Institute of Industrial Technology, Contribution ratio: gBrain 100%, Management research institution: gBrain, Inc., Research period: from 2020 Sep. 1 to 2026 Dec. 31 (total research period)/from 2022 Mar. 1 to 2022 Dec. 31 (research period in the year).

Further, the present disclosure is a research result supported with Parkinson's disease treatment subject based on a graphene electrode and a human body communication wireless chip in public procurement-linked national life research demonstration commercialization support project financially supported by Ministry of Science and ICT of Korea in 2021 (subject No. 1711170519). The detailed information of the national project acknowledgment of the present disclosure is as follows. Subject No: 1711170519, Department name: Ministry of Science and ICT of Korea, Research project name: public procurement-linked national life research demonstration commercialization support project, Research subject name: Parkinson's disease treatment subject based on a graphene electrode and a human body communication wireless chip, Research and management institution: National Research Foundation of Korea, Contribution ratio: gBrain 100%, Management research institution: gBrain, Inc., Research period: from 2021 Oct. 1 to 2023 Mar. 31 (total research period)/from 2022 Apr. 1 to 2023 Mar. 31 (research period in the year).

Further, the present disclosure is a research result supported with a subject of neurodegenerative disorder diagnosis•treatment and nerve measurement and stimulation medical device for assistant device based on brain-machine interface (BMI) of public-private joint startup development project financially supported by Ministry of SMEs and Startups of Korea in 2022 (subject No. 20087365). The detailed information of the national project acknowledgment of the present disclosure is as follows. Subject No: 20087365, Department name: Ministry of SMEs and Startups of Korea, Research project name: Public-private joint startup development project, Research subject name: Neurodegenerative disorder diagnosis•treatment and nerve measurement and stimulation medical device for assistant device based on brain-machine interface (BMI), Research and management institution: Korea Institute of Startup & Entrepreneurship Development, Contribution ratio: gBrain 100%, Management research institution: gBrain, Inc., Research period: from 2022 Jun. 1 to 2023 Mar. 31.

Description of the Related Art

Neural recording that is the key technology for a brain-computer interface is a technology that detects a weak neural signal by bringing an electrode in contact with nerve cells and then transmits the detected signal to an external device.

Since nerve cells are inside a body, in the related art, a device for detecting neural signals is put into a body, the internal device in the body and an external device are connected through a line, and the signals detected by the internal device are transmitted to the external device. However, this method is accompanied by issues related to usability and operation stability.

In order to solve this problem, a wireless recording technology that completely implants an internal device in a body and connects the internal device to an external device in a wireless type has been proposed. In this case, an internal device completely implanted in a body and an external device existing outside the body transmit signals detected from nerve cells to the outside of the body through wireless communication and wireless power transmission.

SUMMARY OF THE INVENTION

An RF type using an antenna, an ultrasonic communication type using an ultrasonic transducer, and an inductive coupling type using an inductor coil were used for wireless communication and wireless power transmission of a wireless neural recording technology in the related art. However, the wireless neural recording technology has a problem that an antenna, a coil, a transducer, etc. should be specially manufactured, a cell stability problem related to heat generation by an antenna, a coil, a transducer, etc. implanted in a body, and a matching problem of an internal device and an external device. A technology of increasing usability of the wireless neural recording technology may be required.

According to an embodiment, it is possible to provide a wireless neural interface system that solves the problems of power optimization, matching, position selection, and stability by performing neural signal detection, wireless communication, and wireless power transmission/reception through simple electrodes positioned inside and outside a body.

However, objectives are not related to the objectives described above and other objectives may exist.

According to an embodiment, an internal device of a wireless neural interface system that performs communication through a human body channel may include: bioelectrodes including a first electrode, a second electrode, a third electrode, and a fourth electrode that are attached inside a human body; an oversampling converter configured to detect a biosignal on the basis of the first electrode and the second electrode, and output an oversampling signal by oversampling the biosignal; a wireless signal transmitter configured to encode the oversampling signal on the basis of a human body channel characteristic, and transmit the encoded oversampling signal to an external device, which is connected with the internal device through the human channel, through the third electrode; and a wireless power receiver configured to supply power to the oversampling converter and the wireless signal transmitter in response to a power signal received from the external device through the fourth electrode.

The first electrode and the second electrode may be attached to the cerebral cortex of a human body, and the third electrode and the fourth electrodes may be attached to the cerebral cortex of a human body or the scalp of a human body.

The encoded oversampling signal may be a 3-level signal.

The oversampling converter may detect the biosignal on the basis of a potential difference between the first electrode and the second electrode.

The oversampling converter may include: one or more sigma-delta modulator configured to convert an analog signal into a digital signal through oversampling; and a serializer configured to convert one or more output signals of the one or more sigma delta modulators arranged in parallel into a single signal.

The wireless signal transmitter may include: an encoder configured to adjust a duty cycle of a digital signal on the basis of the human body channel characteristic; and a 3-level amplifier configured to convert an output signal of the encoder, which is a 2-level signal, into a 3-level signal.

The wireless power receiver may include: a rectifier configured to convert an AC signal received from the external device through the fourth electrode into a DC signal; and a regulator configured to output DC signals of various levels from the DC signal.

According to an embodiment, an external device of a wireless neural interface system that performs communication through a human body channel may include: bio-electrodes including a first electrode, a second electrode, and a third electrode that are attached outside a human body; a wireless signal receiver configured to receive an encoded oversampling signal output from an internal device, which is connected with the external device through the human body channel, through the first electrode and the second electrode, and downsample the oversampling signal; and a wireless power transmitter configured to transmit a power signal to the internal device through the third electrode.

The wireless signal receiver may detect the encoded oversampling signal on the basis of a potential difference between the first electrode and the second electrode.

The encoded oversampling signal may be a 3-level signal.

The wireless signal receiver may include: a front end amplifier configured to output an amplified oversampling signal by amplifying the encoded oversampling signal; a clock extractor configured to extract a clock signal from the amplified oversampling signal; a recovery circuit configured to restore the amplified oversampling signal into a clock signal and data (e.g., an oversampling signal) that were supposed to be transmitted by the internal device on the basis of the clock signal; a decimator configured to downsample the data; and a Bluetooth device configured to transmit the downsampling data to an electronic device connected with the interface system.

The wireless power transmitter may include a boost driver configured to amplify a voltage of the power signal.

DETAILED DESCRIPTION OF THE INVENTION

Specific structural and functional description of embodiments is proposed to simply show examples and may be implemented in various ways. Accordingly, the actual implement is not limited only to the proposed specific embodiments and the range of this specification includes modification, equivalents, or substitutions included in the spirit described through embodiments.

Terms such as "first" and "second" may be used to describe various components, but these terms should be analyzed only to distinguish one component from another component. For example, the first component may be named the second component, and vice versa.

It is to be understood that when one element is referred to as being "connected to" another element, it may be connected directly to or coupled directly to another element or be connected to or coupled to another element, having the other element intervening therebetween.

Singular forms are intended to include plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Unless defined otherwise, it is to be understood that all the terms used in the specification including technical and scientific terms has the same meaning as those that are understood by those who skilled in the art. It will be further understood that terms defined in dictionaries that are commonly used should be interpreted as having meanings that are consistent with their meanings in the context of the relevant art and will not be interpreted in an idealized or overly formal sense unless expressly so defined herein.

Hereafter, embodiments are described in detail with reference to the accompanying drawings. In description of the accompanying drawing, same components are given the same reference numerals regardless of the figure numbers and are not repeatedly described.

Figure 1:
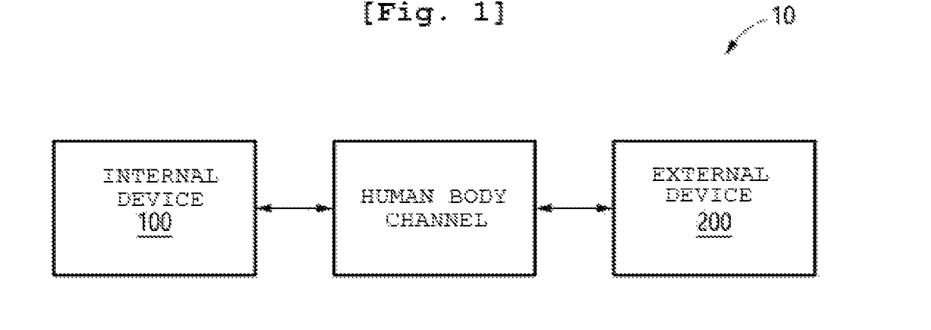
FIG. 1 is a brief block diagram of a wireless neural interface system according to an embodiment of the present disclosure.

FIG. 1 is a brief block diagram of a wireless neural interface system according to an embodiment of the present disclosure.

A wireless neural interface system 10 according to various embodiments can perform neural signal detection, wireless communication, and wireless power transmission/reception through simple electrodes positioned inside and outside a body. The wireless neural interface system 10 can perform communication (e.g., bionic communication) through a human body channel on the basis of bio-electrodes. The wireless neural interface system 10 may be a system that solves problems of power optimization, matching, position selection, and stability using simple bio-electrodes without using an antenna, a transducer, or a coil specially manufactured for sufficient wireless power transmission and/or wireless communication of a high communication bandwidth.

The wireless neural interface system 10 can perform wireless communication through electrodes even without accurate matching and position selection between an internal device 100 and an external device 200, and the positions of the electrodes may be selected on the basis of a human body channel characteristic.

The wireless neural interface system 10 may be a system that optimizes power consumption of the internal device 100 that is supposed to use limited power by minimizing the configuration of the internal device 100 and adding configuration to the external device 200.

Data transmitted from the internal device 100 of the wireless neural interface system 10 can be decoded in a smartphone or a PC and the wireless neural interface system 10 may be used for a new type semiconductor chip or fully implantable wireless neural recording device that measures and transmits brain activity.

The wireless neural interface system 10 may be applied to a brain-computer interface (BCI) that controls devices by measuring and decoding biosignals that are generated from a brain, and may be applied to a technology of diagnosing and treating diseases on the basis of brain waves that are sensed from patients with brain diseases (e.g., epilepsy, Parkinson's disease, tinnitus, stroke, etc.).

Figure 2A:
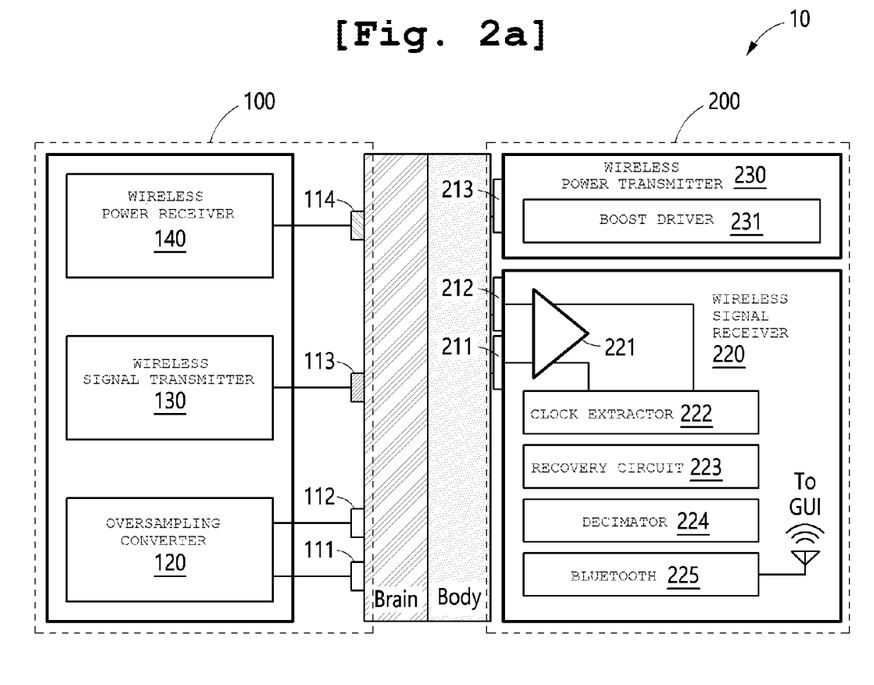
FIGS. 2A and 2B show examples of the wireless neural interface system shown in FIG. 1.
Figure 2B:
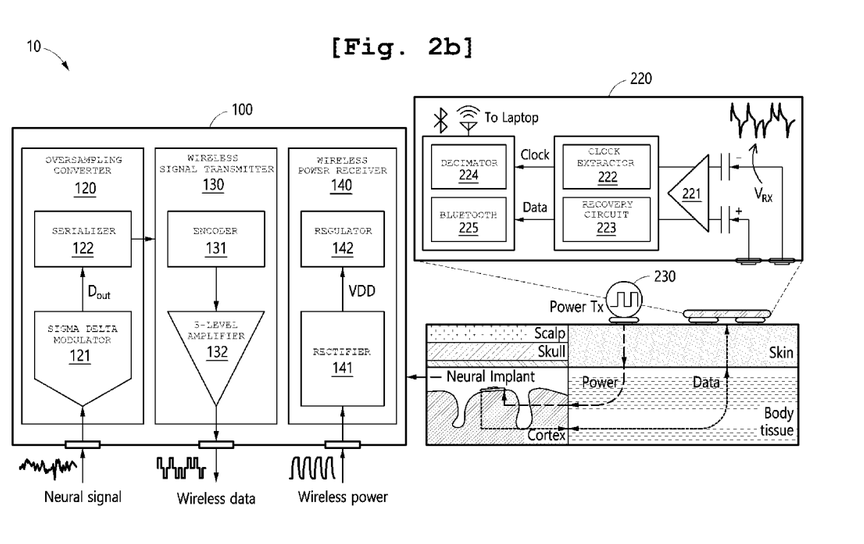

FIGS. 2A and 2B show examples of the wireless neural interface system shown in FIG. 1.

The wireless neural interface system 10 may include an internal device 100 that is disposed in a human body and an external device 200 that is disposed outside a human body, and the internal device 100 and the external device 200 can perform communication through a human body channel on the basis of bio-electrodes.

The internal device 100 may include bio-electrodes 111 to 114, an oversampling converter 120, a wireless signal transmitter 130, and a wireless power receiver 140, and the external device 200 may include bio-electrodes 211 to 213, a wireless signal receiver 220, and a wireless power transmitter 230.

The bio-electrodes 111 to 114 may include a first electrode 111, a second electrode 112, a third electrode 113, and a fourth electrode 114. The bio-electrodes 111 to 114 are attached inside a human body and can communicate with the bio-electrodes 211 to 213 attached outside the human body. The first electrode 111 and the second electrode 112 are attached to the cerebral cortex of a human body, and the third electrode 113 and the fourth electrode 114 may be attached to the cerebral cortex of a human body or the scalp of a human body on the basis of a human body channel characteristic.

The oversampling converter 120 can detect a biosignal on the basis of the first electrode 111 and the second electrode 112 and can output an oversampling signal by oversampling the detected biosignal. In this case, the oversampling converter 120 can detect a biosignal on the basis of the potential difference between the first electrode 111 and the second electrode 112. The oversampling converter 120 may include a sigma delta modulator 121 and a serializer 122. The sigma delta modulator 121 can convert an analog signal (e.g., biosignal) into a digital signal through oversampling and the serializer 122 can convert one or more output signals of one or more sigma delta modulators 121 arranged in parallel into a single signal.

The wireless signal transmitter 130 can encode an oversampling signal on the basis of a human body channel characteristic and can transmit the encoded oversampling signal to the external device 200 through the third electrode 113. The wireless signal transmitter 130 may include an encoder 131 and a 3-level amplifier 132. The encoder 131 can adjust the duty cycle of a digital signal (e.g., oversampling signal) on the basis of a human body channel characteristic and the 3-level amplifier 132 can convert an output signal of the encoder 131, which is a 2-level signal, into a 3-level signal.

The wireless power receiver 140 can supply power to the oversampling converter 120 and the wireless signal transmitter 130 in response to a power signal received from the external device 200 through the fourth electrode 114. The wireless power receiver 140 may include a rectifier 141 and a regulator 142. The rectifier 141 can convert an AC signal received from the external device 200 through the fourth electrode 114 into a DC signal and the regulator 142 can output DC signals of various levels from a DC signal.

The bio-electrodes 211 to 213 may include a first electrode 211, a second electrode 212, and a third electrode 213. The bio-electrodes 211 to 213 are attached outside a human body and can communicate with the bio-electrodes 111 to 114 attached inside the human body.

The wireless signal receiver 220 can receive an encoded oversampling signal, which is output from the internal device 100, through the first electrode 211 and the second electrode 212 and can downsampling the oversampling signal. In this case, the wireless signal receiver 220 can detect an encoded oversampling signal on the basis of the potential difference between the first electrode 211 and the second electrode 212. The wireless signal receiver 220 may include a front end amplifier 221, a clock extractor 222, a recovery circuit 223, a decimator 224, and a Bluetooth device 225. The front end amplifier 221 can amplify an amplified oversampling signal by amplifying the encoded oversampling signal. The clock extractor 222 can extract a clock signal from the amplified oversampling signal. The recovery circuit 223 can restore the amplified oversampling signal into a clock signal and data (e.g., an oversampling signal) that were supposed to be transmitted by the internal device 100 on the basis of the clock signal. The decimator 224 can downsample data and the Bluetooth device 225 can transmit the downsampling data to an electronic device connected with the interface system 10.

The wireless power transmitter 230 can transmit a power signal to the internal device 100 through the third electrode 213. The wireless power transmitter 230 can amplify the voltage of a power signal through a boost driver 232 and transmit the power signal to the internal device 100.

Figure 3:
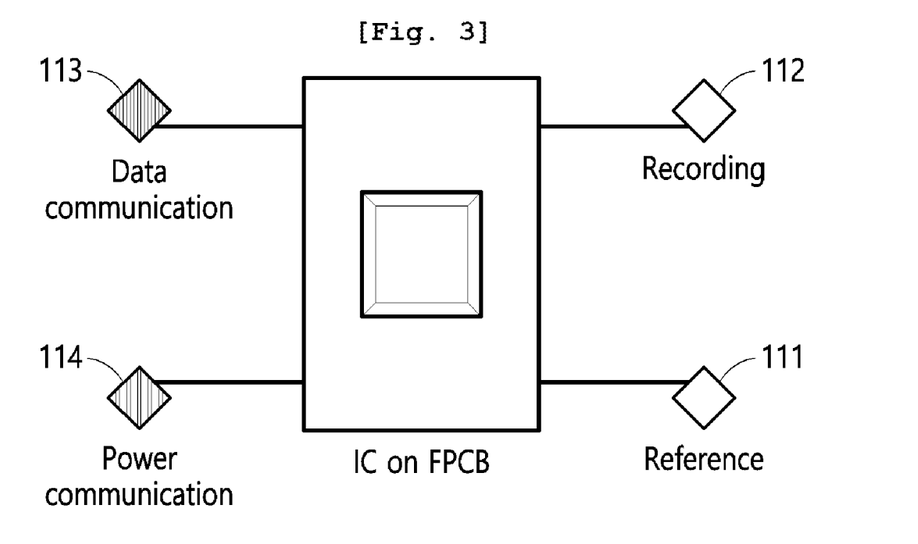
FIG. 3 shows an example of the internal device shown in FIG. 1.

FIG. 3 shows an example of the internal device shown in FIG. 1.

The wireless neural interface system 10 may be a system that reduces the defects of existing systems by using electrodes (e.g., bio-electrodes 111 to 114) without using an antenna, a transducer, or a coil specially manufactured for sufficient wireless power transmission and wireless signal transmission having a high communication bandwidth.

The wireless neural interface system 10 may be a system that overcomes a matching issue, a position selection issue, a form factor issue, a stability issue, etc. of the related art by using additionally electrodes (e.g., the third electrode 113 and the fourth electrode 114) for wireless signal transmission and wireless power signal reception in addition to a reference electrode (e.g., the first electrode 111) and a recording electrode (e.g., the second electrode 112) that are required to obtain a signal.

Disposition of electrodes (e.g., 111 to 114) in a human body may have great the operation characteristic of a system in a communication type that uses electrodes. Hereafter, disposition of electrodes in a human body (e.g., a brain) is described.

Figure 4:
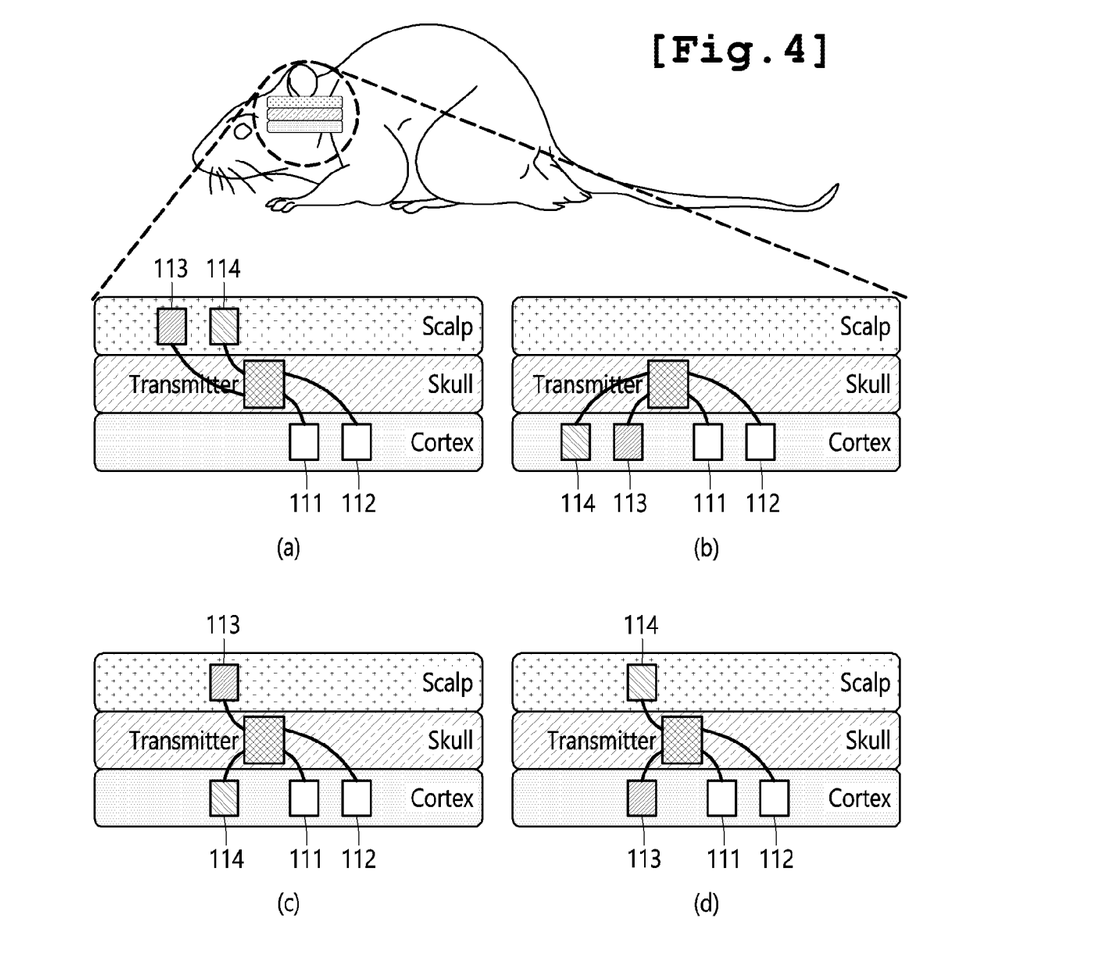
FIG. 4 shows examples of electrode attachment positions.

FIG. 4 shows examples of electrode attachment positions.

The first electrode 111 and the second electrode 112 are attached to the cerebral cortex of a human body, and the third electrode 113 and the fourth electrode 114 may be attached to the cerebral cortex of a human body or the scalp (e.g., the cranial scalp) of a human body on the basis of a human body channel characteristic.

Referring to FIG. 4A, the first electrode 111 and the second electrode 112 are attached to the cerebral cortex of a human body, and the third electrode 113 and the fourth electrode 114 may be attached to the scalp (e.g., the cranial scalp) of a human body on the basis of a human body channel characteristic.

Referring to FIG. 4B, the first electrode 111 and the second electrode 112 are attached to the cerebral cortex of a human body, and the third electrode 113 and the fourth electrode 114 may also be attached to the cerebral cortex of a human body on the basis of a human body channel characteristic.

Referring to FIG. 4C, the first electrode 111 and the second electrode 112 are attached to the cerebral cortex of a human body, the third electrode 113 may be attached to the scalp (e.g., the cranial scalp) of a human body, and the fourth electrode 114 may be attached to the cerebral cortex of a human body.

Referring to FIG. 4D, the first electrode 111 and the second electrode 112 are attached to the cerebral cortex of a human body, the fourth electrode 114 may be attached to the scalp (e.g., the cranial scalp) of a human body, and the third electrode 113 may be attached to the cerebral cortex of a human body.

Electrodes (e.g., 211 to 213) of an external device (e.g., the external device 200 of FIG. 2A) may be disposed in consideration of disposition of electrodes (e.g., 111 to 114) of an internal device (e.g., the internal device 100 of FIG. 2A). A first electrode (e.g., the first electrode 211 of FIG. 2A) and a second electrode (e.g., the second electrode 212 of FIG. 2A) may be disposed on the basis of a signal transmission direction. For example, the first electrode 211 and the second electrode 212 may be disposed parallel with a signal transmission direction. A third electrode (e.g., the third electrode 213 of FIG. 2A) may be positioned between the first electrode 211 and the second electrode 212 and may be disposed close to the fourth electrode 114 of the internal device 100 for efficient power transmission/reception.

Figure 5:
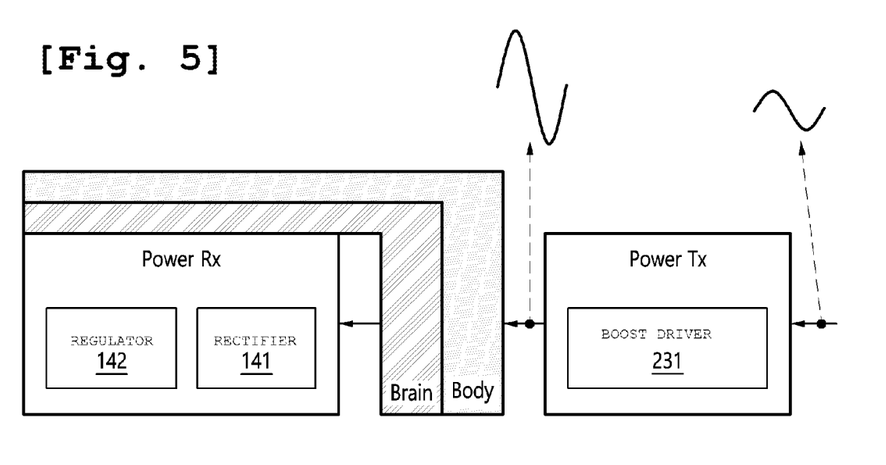
FIG. 5 is a view for describing wireless power transmission/reception.

FIG. 5 is a view for describing wireless power transmission/reception.

The wireless neural interface system 10 can perform wireless power transmission/reception through electrodes. An electrode-based transmission channel may have a capacitive channel characteristic, and the higher the voltage of a signal that is transmitted from the external device 200, the large the magnitude of a signal that is transmitted to the internal device 100 may be. It may be more efficient in power transmission to increase the magnitude of a voltage rather than power efficiency of a signal that is supposed to be transmitted to a power transmitter (e.g., the wireless power transmitter 230 of FIG. 2A).

The external device 200 of the wireless neural interface system 10 can amplify the voltage of a power signal through the boost driver 231 and can transmit the power signal with the amplified voltage to the internal device 100.

Figure 6:
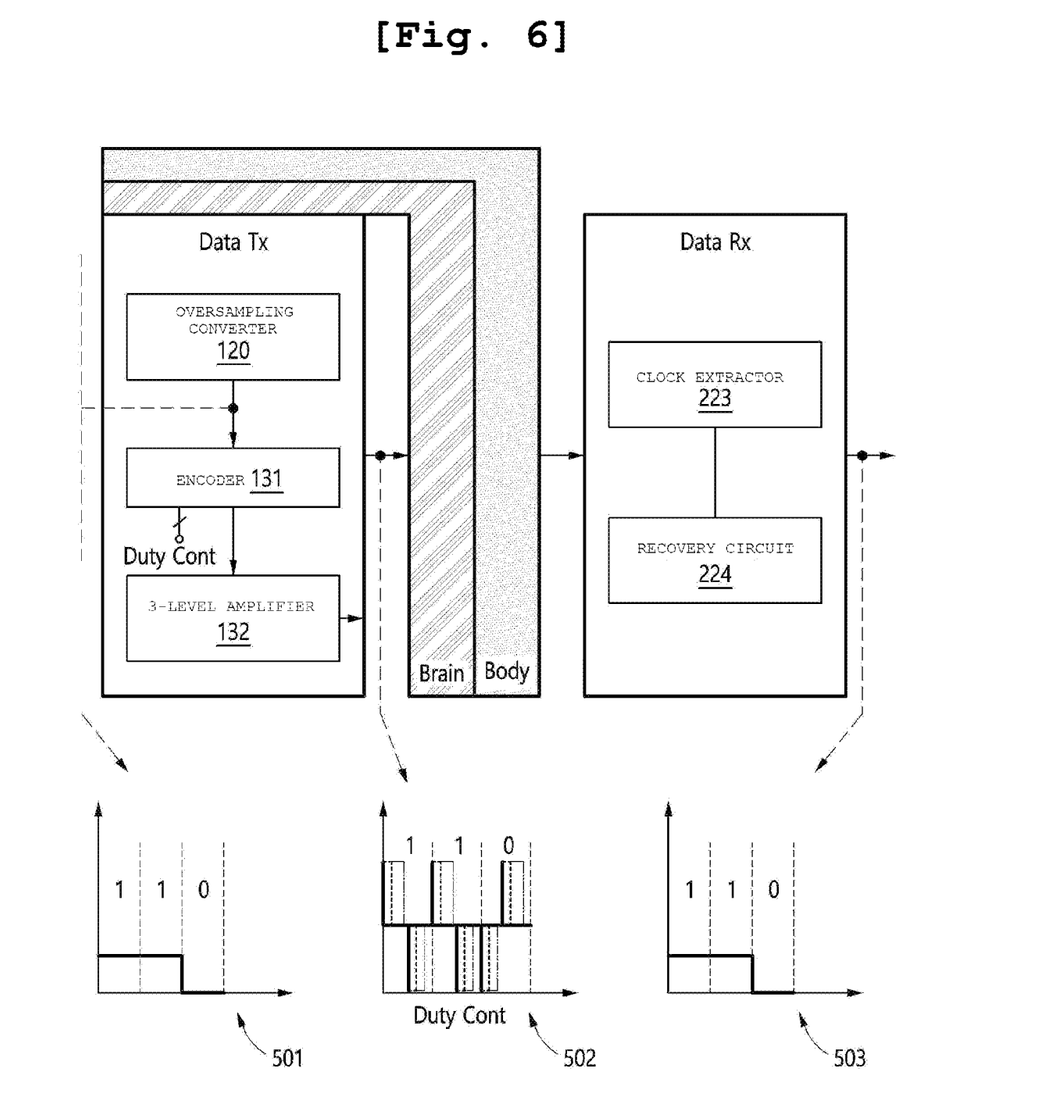
FIG. 6 is a view for describing wireless communication.

FIG. 6 is a view for describing wireless communication.

The wireless neural interface system 10 can perform wireless communication through electrodes. The channel characteristic of electrode-based communication may depend on situations and the internal device 100 can transmit a wireless signal in consideration of the channel characteristic.

The oversampling converter 120 can output an oversampling signal 501 by oversampling a biosignal. The oversampling converter 120 can oversample a biosignal on the basis of a frequency band (e.g., 20 MHz) optimized for a human body channel.

The encoder 131 can adjust the duty cycle of the oversampling signal 501 on the basis of a human body channel characteristic and the 3-level amplifier 132 can convert and output the oversampling signal with the adjusted duty cycle into a 3-level signal (e.g., 502). The duty cycle may be determined by an electronic device that is different from the external device 200 or the interface system 10, and the encoder 131 may be synchronized with an electronic device that is different from the external device 200 or the interface system 10.

The wireless signal receiver 220 can restore a signal (503), which was supposed to be transmitted from the internal device 100, from the signal 502 on the basis of the clock extractor 223 and the recovery circuit 224.

The decimator 214 is s implemented in the external device 200 in the neural interface system 10, whereby the configuration of the internal device 100 that is supposed to use limited power can be minimized and power consumption of the internal device can be optimized.

The hardware device described above may be configured to operate as one or a plurality of software modules to perform the operation of the present invention, and vice versa.

Although embodiments were described with reference to the limited drawings, various technical changes and modifications may be possible by those skilled in the art on the basis of the above description. For example, the described technologies may be performed in order different from the described method, and/or even if components such as the described system, structure, device, and circuit are combined or associated in different ways from the description or replaced by other components or equivalents, appropriate results can be accomplished.

Therefore, other implements, other embodiments, and equivalents to the claims are included in the following claims.

What is claimed is:

1. An internal device of a wireless neural interface system that performs communication through a human body channel, the internal device comprising:
   bio-electrodes including a first electrode, a second electrode, a third electrode, and a fourth electrode that are attached inside a human body;
   an oversampling converter configured to detect a biosignal on the basis of the first electrode and the second electrode, and output an oversampling signal by oversampling the biosignal;
   a wireless signal transmitter configured to encode the oversampling signal on the basis of a human body channel characteristic, and transmit the encoded oversampling signal to an external device, which is connected with the internal device through the human channel, through the third electrode; and
   a wireless power receiver configured to supply power to the oversampling converter and the wireless signal transmitter in response to a power signal received from the external device through the fourth electrode.

2. The internal device of claim 1, wherein the first electrode and the second electrode are attached to the cerebral cortex of a human body, and the third electrode and the fourth electrodes are attached to the cerebral cortex of a human body or the scalp of a human body.

3. The internal device of claim 1, wherein the encoded oversampling signal is a 3-level signal.

4. The internal device of claim 1, wherein the oversampling converter detects the biosignal on the basis of a potential difference between the first electrode and the second electrode.

5. The internal device of claim 1, wherein the oversampling converter includes:

one or more sigma-delta modulator configured to convert an analog signal into a digital signal through oversampling; and a serializer configured to convert one or more output signals of the one or more sigma delta modulators arranged in parallel into a single signal.

6. The internal device of claim 1, wherein the wireless signal transmitter includes:

an encoder configured to adjust a duty cycle of a digital signal on the basis of the human body channel characteristic; and a 3-level amplifier configured to convert an output signal of the encoder, which is a 2-level signal, into a 3-level signal.

7. The internal device of claim 1, wherein the wireless power receiver includes:

a rectifier configured to convert an AC signal received from the external device through the fourth electrode into a DC signal; and a regulator configured to output DC signals of various levels from the DC signal.

8. An external device of a wireless neural interface system that performs communication through a human body channel, the external device comprising:

bio-electrodes including a first electrode, a second electrode, and a third electrode that are attached outside a human body;

a wireless signal receiver configured to receive an encoded oversampling signal output from an internal device, which is connected with the external device through the human body channel, through the first electrode and the second electrode, and downsample the oversampling signal; and a wireless power transmitter configured to transmit a power signal to the internal device through the third electrode.

9. The external device of claim 8, wherein the wireless signal receiver detects the encoded oversampling signal on the basis of a potential difference between the first electrode and the second electrode.

10. The external device of claim 8, wherein the encoded oversampling signal is a 3-level signal.

11. The external device of claim 8, wherein the wireless signal receiver includes:

a front end amplifier configured to output an amplified oversampling signal by amplifying the encoded oversampling signal;

a clock extractor configured to extract a clock signal from the amplified oversampling signal;

a recovery circuit configured to restore the amplified oversampling signal into a clock signal and data that were supposed to be transmitted by the internal device on the basis of the clock signal;

a decimator configured to downsample the data; and a Bluetooth device configured to transmit the downsampling data to an electronic device connected with the interface system.

12. The external device of claim 8, wherein the wireless power transmitter includes a boost driver configured to amplify a voltage of the power signal.

* * * * *